June 26, 1934.    R. LESTER    1,964,002
VEHICLE LICENSE TAG ATTACHMENT
Original Filed Feb. 17, 1931
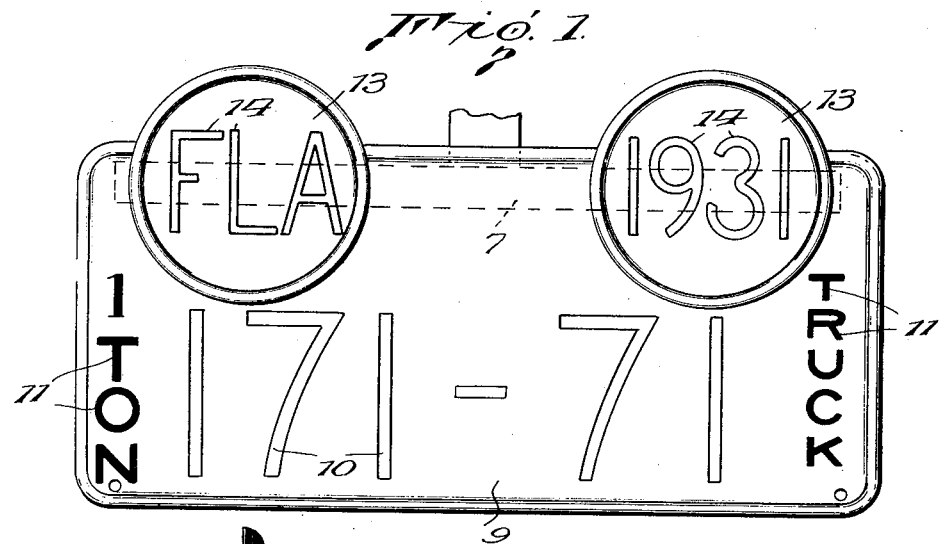
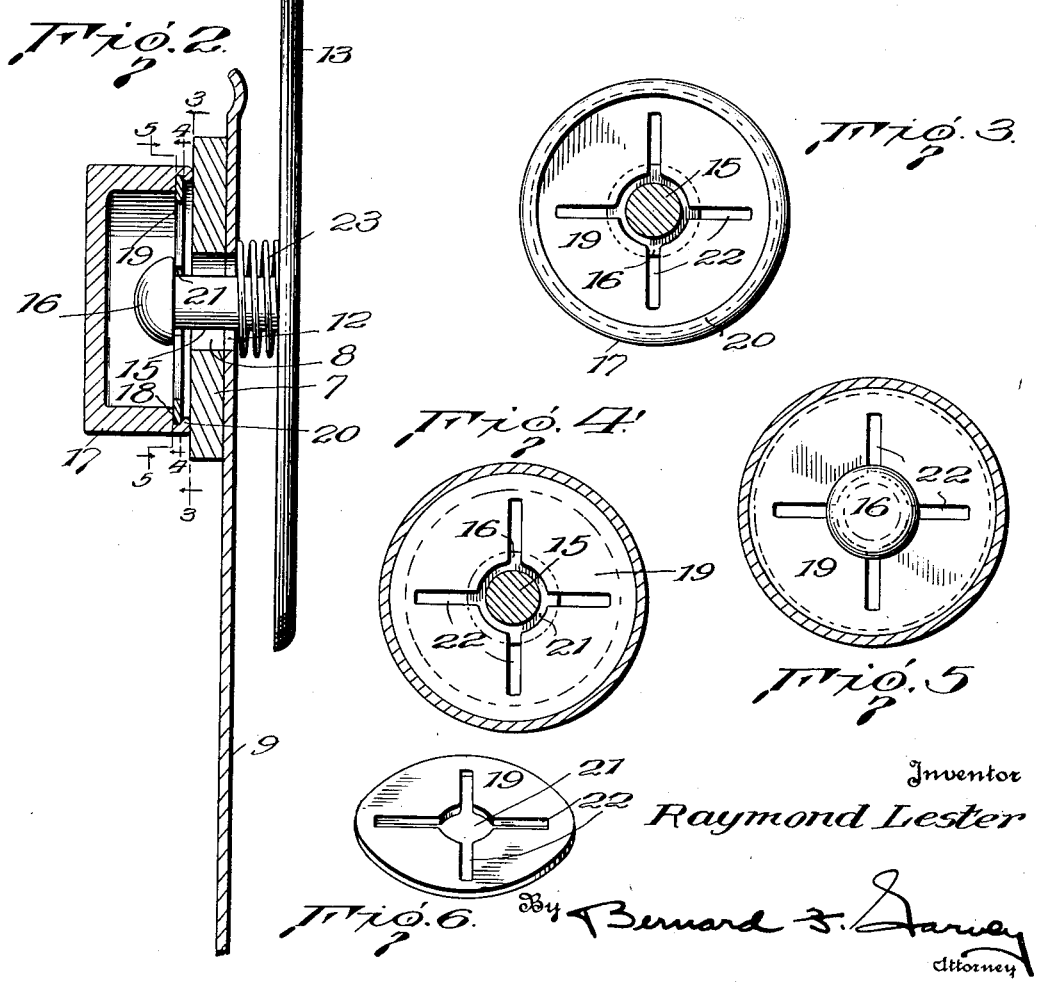
Inventor
Raymond Lester
By Bernard F. Garvey
Attorney Patented June 26, 1934

1,964,002

UNITED STATES PATENT OFFICE 1,964,002

VEHICLE LICENSE TAG ATTACHMENT

Raymond Lester, Jacksonville, Fla., assignor of one-half to Frank J. Hyland, Daytona Beach, Fla.

Application February 17, 1931, Serial No. 516,453
Renewed September 14, 1933

1 Claim. (Cl. 40—125)

The present invention consists of a vehicle licence tag attachment, an object of which is to permit use of a license tag for an indefinite period of time, but only on the vehicle of original installation.

Another object of the invention is to designate the name of the State and the year by different medii from the tag and to annex said medii to the tag by suitable locking means to prevent removal of the tag without destroying the locking means or mutilating the tag.

A further object of the invention is to provide means for automatically locking a license tag to its supporting bracket which is exceedingly simple in construction, easy of installation, and practically fool-proof.

Other objects of the invention will be apparent from the following description of the present preferred form thereof, taken in connection with the accompanying drawing, wherein Fig. 1 is a front elevational view of a vehicle license tag attachment, constructed in accordance with the present invention;

Fig. 2 is a vertical sectional view thereof, showing to advantage the locking mechanism;

Fig. 3 is a sectional view, taken on the line 3—3 of Fig. 2, looking in the direction of the arrow;

Fig. 4 is a similar view, taken on the line 4—4 of Fig. 2, looking in the direction of the arrow;

Fig. 5 is a further sectional view taken on the line 5—5 of Fig. 2, looking in the direction of the arrow; and, Fig. 6 is a perspective view of the locking disc forming a part of the present invention.

To illustrate the present invention, a portion of a vehicle license tag supporting bracket 7 is shown, which is, of course, adapted to be fixedly secured to the vehicle in a manner well-known in the art. The bracket is provided with openings 8 through which locking means, hereinafter described, pass.

The license tag, contemplated by the present invention, is indicated at 9 and has the numbers only thereon, indicated at 10, together with indicia 11, representative of the type of vehicle for which the license tag has been issued. The tag does not carry either the name of the State or the year for which the license tag is usable. The tag is provided with openings 12 adjacent the upper marginal edge thereof, also adapted to receive therethrough locking means hereinafter described.

The locking means constructed in accordance with the present invention embodies buttons 13 of identical construction, each of which in the present instance, is shown to be of circular or discal configuration, having the marginal edge thereof crimped to reinforce the same and provided with indicia 14. The indicia on one of the buttons designates the name of the State issuing the license tag, and the indicia on the other button designates the year during which the tag may be used. Each button has a shank 15 extending from the face opposite to that carrying the indicia, the shank terminating in a head 16, the outer or entering terminal of which is rounded for a purpose hereinafter set out. The locking means further includes a casing or shell 17, a portion of the inner periphery of which is removed to provide a recess 18 which is adapted for the reception of a locking disc 19. The portion of the shell or casing at the juncture of the recess portion 18 with the body provides a shoulder against which the disc abuts. The free margin of the casing or shell is curled over the disc, as indicated at 20 to prevent displacement of the latter.

In use of this device the rounded head 16 of the button is urged through the opening 12 of the tag 9, which latter is positioned in front of the bracket 7. The head 16 is also moved through the opening 8 of the bracket 7 and then forced through a central opening 21, formed in the locking disc 19. The opening 21 has slots 22 radiating therefrom to permit the central portion of the disc to flex under pressure, allowing the head 16 to be sprung through the disc and to lock against the rear face of the latter, as shown in Fig. 2. The locking disc is preferably made of thin sheet brass, to prevent distortion or mutilation thereof when the head 16 is forced therethrough. In order to take up lost motion between the license tag and button and prevent rattle of the tag, I mount a helical spring 23 on the shank 15 of the button, said spring being interposed between the button and the license tag.

By use of the present invention it is apparent that the same license tag may be used for an indefinite period of time, it being necessary only to renew the year button. It is apparent that removal of a button 13 can only be accomplished either by mutilating the tag 9 or by the destruction of the locking disc 19. Consequently, when one of the buttons has been removed, it is necessary that it be replaced by a new one having new locking parts. It is of course, understood that the shank 15 of the button may be case-hardened to prevent the possibility of severing the same by sawing. Furthermore, I have shown only a preferred form of shell 17, since I am aware that the shell may be variously constructed and the locking disc mounted therein in various ways. However, the present method is simple, yet positive, since as shown to advantage in Fig. 2, the rolling of the free margin of the shell over the disc holds the latter from displacement, but additionally a clamping effect on said shell is accomplished by impingement of the bracket 7 thereagainst. Attempted removal of the button more firmly clamps the disc 19 in the shell and it is consequently necessary to mutilate or distort the disc in order to remove the head 16 from the shell.

It is of course, to be understood that various changes may be made in the construction, proportion and arrangement of parts of this invention, within the scope of the appended claim.

What is claimed is:

In combination with a vehicle tag and supporting bracket therefor, a shell having a portion of its inner periphery removed to provide a shoulder within the shell, a disc impinged against said shoulder, the marginal edge of the shell being bent into engagement with the disc to permanently hold the latter against said shoulder, the spring-pressed means engageable through the license tag supporting bracket and disc, said means including a headed shank, the head of which is engageable through the disc into a permanently locked position and a spring on the shank to force the head of the latter against the disc for constantly urging the inturned margin of the shell into snug engagement with the bracket.

RAYMOND LESTER.